May 15, 1934.  C. W. STEVENS  1,958,684

VALVE

Filed June 22, 1931

Inventor
CHARLES W. STEVENS
By
his Attorney

Patented May 15, 1934

1,958,684

UNITED STATES PATENT OFFICE 1,958,684

VALVE

Charles W. Stevens, Bexley, Ohio, assignor to The Lattimer Stevens Company, Columbus, Ohio, a corporation of Ohio Application June 22, 1931, Serial No. 545,962

1 Claim. (Cl. 277—25)

The object of this invention is to provide a valve with improved and inexpensive means for automatically closing the fluid passage through it. The invention is particularly useful in connection with pipes for conveying combustible or explosive gas, as for example, by a service pipe leading into a cellar. Where no provision is made for automatically shutting off the gas a fire will be naturally aggravated by the escaping gas.

The invention is embodied in the example herein shown and described, the feature of novelty being pointed out in the claim.

In the accompanying drawing—

Figure 1:
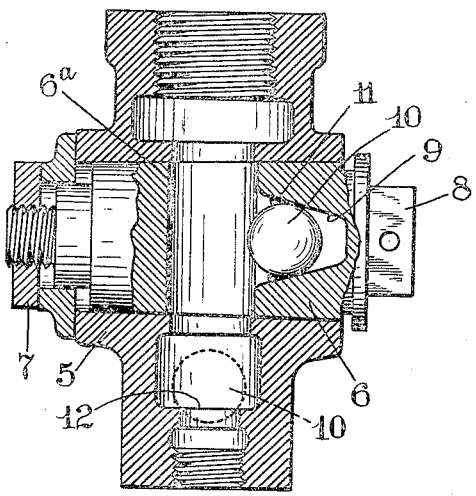
Figure 1 is a vertical section through the valve according to the invention, parts being shown in full.
Figure 2:
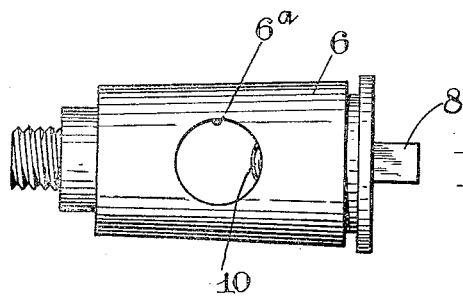
Fig. 2 is a plan view of the plug of the valve removed from the case looking at the fluid passage therethrough.

In the views 5 designates the valve case which is of an ordinary form provided with a seat for a rotatable plug and having a through passage and threaded ends for connecting the valve with the necessary pipes.

The character 6 designates the plug which is provided with the usual cross passage 6ª to be alined and disalined as may be desired with the passage of the case according to whether the flow of fluid is to be established or cut off. The plug is held in its seat by a nut 7 threaded on the end of a stem at the smaller end of the plug, while the other end of the plug is provided with a lug 8 to receive a wrench for turning the plug.

The larger end of the plug is shown as provided with a tapered or conoidal recess 9 in which is placed a ball valve 10 preferably of metal that is secured in position by means of a modicum of solder 11 fusible only at a temperature created by a dangerous fire in proximity to the valve. The ball valve is made of smaller diameter than that of the cross passage 6ª to facilitate the placing and soldering of said ball in the recess 9 after the plug has been manufactured.

The outlet or lower end of the valve case is provided with a circular valve seat 12 of smaller diameter than that of the ball valve 10, the edge of said seat being preferably sharp.

In practice when the heat rises to the temperature suggested the ball valve 10 is released by the fusing of the solder and falls onto the seat 12, as shown by broken line Fig. 1, thereby closing the passage through the valve case and shutting off the gas. In this way even if the pipe or other structure beyond the valve be destroyed the gas is prevented from passing into the burning structure.

The forms of the parts can be changed without departing from the gist of the invention as claimed.

What I claim is:

In means of the class described, a valve case having a substantially vertical fluid passage, a rotary plug seat transverse said passage and an emergency valve seat in said passage below said plug seat, a rotary valve plug in said transverse seat for opening and closing said substantially vertical passage at will, said plug having a cross passage for opening said passage of the valve case, and said cross passage having a tapered socket extended laterally from the wall of said cross passage and a thermally releasable ball valve secured in said tapered socket substantially out of line with said cross passage, said ball valve adapted to fall by gravity from said tapered socket and close on said emergency seat upon a predetermined rise in temperature.

CHARLES W. STEVENS.